(12) United States Patent
Bunch

(10) Patent No.: US 10,578,733 B2
(45) Date of Patent: Mar. 3, 2020

(54) LOW-POWER X BAND BEACON TRANSPONDER

(71) Applicant: Honeywell International Inc., Morris Plains, NJ (US)

(72) Inventor: Brian P. Bunch, Snohomish, WA (US)

(73) Assignee: Honeywell International Inc., Morris Plains, NJ (US)

( * ) Notice: Subject to any disclaimer, the term of this patent is extended or adjusted under 35 U.S.C. 154(b) by 390 days.

(21) Appl. No.: 15/424,388

(22) Filed: Feb. 3, 2017

(65) Prior Publication Data

US 2017/0227633 A1 Aug. 10, 2017

Related U.S. Application Data

(60) Provisional application No. 62/291,955, filed on Feb. 5, 2016.

(51) Int. Cl.
| | |
|---|---|
| *G01S 13/76* | (2006.01) |
| *G01S 1/68* | (2006.01) |
| *G01S 13/95* | (2006.01) |
| *G01S 13/00* | (2006.01) |

(52) U.S. Cl.
CPC ............ *G01S 13/767* (2013.01); *G01S 1/685* (2013.01); *G01S 13/953* (2013.01)

(58) Field of Classification Search
CPC ...... G01S 13/767; G01S 1/685; G01S 13/953; G01S 13/82; G01S 7/38
USPC .................................................. 342/46, 187
See application file for complete search history.

(56) References Cited

U.S. PATENT DOCUMENTS

| | | | | |
|---|---|---|---|---|
| 3,384,893 | A | * | 5/1968 | Prestwood ..................... 342/187 |
| 4,017,856 | A | * | 4/1977 | Wiegand ................... G01S 7/38 |
| | | | | 342/15 |
| 4,050,070 | A | * | 9/1977 | Beno ....................... G01S 13/82 |
| | | | | 342/187 |
| 4,103,300 | A | | 7/1978 | Gendreu et al. |
| 4,429,312 | A | | 1/1984 | Chisholm |
| 4,612,543 | A | * | 9/1986 | DeVries ................ G01S 13/767 |
| | | | | 342/187 |
| 4,940,986 | A | | 7/1990 | Huguenin |
| 5,475,393 | A | | 12/1995 | Heinzerling |
| 7,619,556 | B1 | | 11/2009 | McCusker |
| 7,898,463 | B1 | | 3/2011 | Mueller et al. |

(Continued)

FOREIGN PATENT DOCUMENTS

| | | | | |
|---|---|---|---|---|
| EP | 0223961 A1 | * | 6/1987 | .......... G01S 13/767 |
| EP | 0273326 A2 | | 7/1988 | |

(Continued)

OTHER PUBLICATIONS

Ahmad et al., "Design of a Compact X-Band Substrate Integrated Waveguide Directional Coupler," International Journal of Engineering and Technology, vol. 5, No. 2, Apr.-May 2013, pp. 1905-1911.

(Continued)

*Primary Examiner* — Bernarr E Gregory
(74) *Attorney, Agent, or Firm* — Shumaker & Sieffert, P.A.

(57) ABSTRACT

In one example, a device includes a receiver configured to receive a low-power X band radar transmission, and a transmitter operably coupled to the receiver and configured to transmit an X band transmission in response to receiving the low-power X band radar transmission.

20 Claims, 3 Drawing Sheets

(56) References Cited

U.S. PATENT DOCUMENTS

| | | | |
|---|---|---|---|
| 8,384,582 B2 * | 2/2013 | Chiassarini | G01S 13/767 342/25 F |
| 8,669,834 B2 | 3/2014 | Cheng et al. | |
| 9,531,085 B2 | 12/2016 | Miraftab et al. | |
| 2013/0169466 A1 | 7/2013 | Frederick | |
| 2015/0234035 A1 | 8/2015 | Lohoefener et al. | |
| 2016/0142095 A1 | 5/2016 | Pos et al. | |
| 2016/0282131 A1 | 9/2016 | Palfreyman | |
| 2017/0003377 A1 | 1/2017 | Menge | |
| 2017/0016974 A1 | 1/2017 | Djerafi et al. | |
| 2017/0104276 A1 | 4/2017 | Vacanti et al. | |
| 2017/0160389 A1 | 6/2017 | Vacanti | |
| 2017/0227633 A1 | 8/2017 | Bunch | |
| 2019/0064341 A1 | 2/2019 | Bunch et al. | |

FOREIGN PATENT DOCUMENTS

| | | | | |
|---|---|---|---|---|
| EP | 0744628 A2 * | 11/1996 | | G01S 13/767 |
| FR | 2828935 A1 * | 2/2003 | | G01S 13/767 |
| WO | 9004795 A1 | 5/1990 | | |
| WO | 2015161849 A1 | 10/2015 | | |
| WO | 2016178609 A1 | 11/2016 | | |

OTHER PUBLICATIONS

Collado, et al., "X-band Substrate Integrated Waveguide (SIW) Active Antenna Self-Oscillating Mixer (SOM)," 2012 IEEE, 2 pp.

Liu, et al., "A Fully Integrated X-Band Phased-Array Transceiver in 0.13-μm SiGe BiCMOS Technology," IEEE Transactions on Microwave Theory and Techniques, vol. 64, No. 2, Feb. 2016, pp. 575-584.

Nawaz, et al., "Substrate Integrated Waveguide (SIW) to Microstrip Transition at X-Band," Proceedings of the 2014 International Conference on Circuits, pp. 61-63.

Vala, et al., "Wideband Directional Coupler for X-band using SIW Technique," ResearchGate, International Journal of Engineering Research & Technology, vol. 4, Issue 11, Nov. 20115, 4 pp.

"X-band transmitter can transmit up to 13.3 GB per pass with a 5 m station designed for LEO CubSat & Nanosatelites," Syrlinks, retrieved on Jan. 23, 2017 from http://www.syrlinks.com/en/products/cubesats/hdr-x-band-transmitter.html, 3 pp.

"Approval of Offshore Standard Approach Procedures, Airborne Radar Approaches, and Helicopter En Route Descent Areas," Advisory Circular, Federal Aviation Administration, Apr. 12, 1999, 58 pp.

"SeaBeacon® 2," System 6 Racon, www.tidelandsignal.com, May 2016, 4 pp.

"WM-RBII Dual Band Frequency Agile Radar Beacon (RACON)," accessed on Jan. 31, 2017, www.wealthmarine.com.sg, 3 pp.

* cited by examiner

LOW-POWER X BAND BEACON TRANSPONDER

This application claims priority to U.S. Provisional Patent Application Ser. No. 62/291,955, entitled "LOW-POWER X BAND RADAR BEACON TRANSPONDER," filed on Feb. 5, 2016, the entirety of which is incorporated by reference herein.

TECHNICAL FIELD

This disclosure relates to radar, and more particularly, to navigation radar.

BACKGROUND

X band radar beacon transponders may be used for navigation. X band radar uses X band transmissions, which are specified as between 8.0 and 12.0 gigahertz (GHz). X band radar beacon transponders (also referred to as "X band beacons") may be configured to receive an incoming X band radar transmission, and respond to receiving that incoming radar transmission by transmitting a transmission. The X band radar transmission frequency band may be the same radar frequency band as is often used for weather radar, including for aircraft weather radar. Thus, an X band beacon may be put in a desired position, and an aircraft's weather radar may double as a navigation aid, by being able to send an X band transmission to ping the X band beacon, and receive an X band response signal at indicating the position of the X band beacon.

SUMMARY

This disclosure is directed to devices, systems, and methods for an X band radar beacon transponder configured to detect low-power X band radar transmissions typical of solid state X band weather systems, and to send reply transmissions at low power that can be received by solid state X band weather systems, where "low power" may be relative to traditional vacuum tube based radar systems. An X band beacon of this disclosure may thus be operationally compatible with solid state X band weather systems onboard aircraft. Thus, an X band beacon of this disclosure may facilitate interoperation of X band beacons with modern solid state aircraft weather radar systems and help improve navigational capabilities for aircraft.

In one example, a device includes a receiver configured to receive a low-power X band radar transmission; and a transmitter operably coupled to the receiver and configured to transmit an X band transmission in response to receiving the low-power X band radar transmission.

In another example, a system includes a solid state receiver configured to receive a low-power X band radar transmission; and a solid state transmitter operably coupled to the receiver and configured to transmit an X band radar transmission in response to receiving the low-power X band radar transmission.

In another example, a method includes receiving, via a receiver, a low-power X band radar transmission; and transmitting, via a transmitter operably coupled to the receiver, an X band transmission in response to receiving the low-power X band radar transmission.

The details of one or more examples are set forth in the accompanying drawings and the description below. Other features, objects, and advantages will be apparent from the description and drawings, and from the claims.

DETAILED DESCRIPTION

Figure 1:
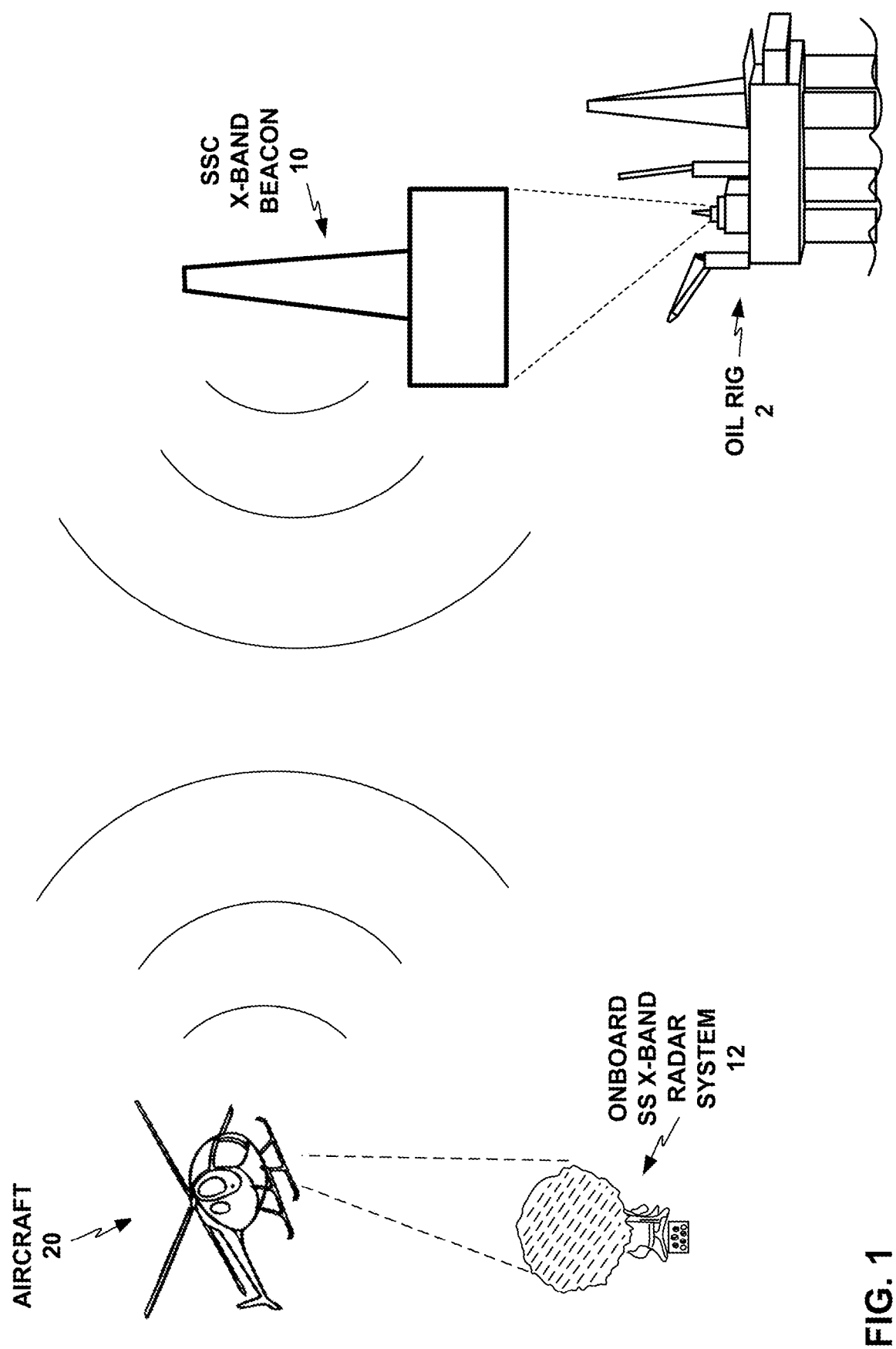
FIG. 1 depicts an example solid state compatible (SSC) X band beacon of this disclosure, detecting a signal from and transmitting a response to an interrogating solid state X band radar system onboard an aircraft.

Various examples are described below generally directed to devices, systems, and methods for low power compatible X band radar beacon transponders, or X band radar beacon transponders that are compatible with aircraft X band radar systems based on solid state technology or that otherwise operate at low power, as further described below. Such X band beacons may be referred to as solid state compatible (SSC) X band beacons or SSC beacons, with the understanding that SSC beacons may be more generally compatible with low power interrogating radar systems such as solid state aircraft weather radar systems. SSC beacons may in some examples also be based on solid state radar technology, or may otherwise be configured to detect and respond to low power interrogating radar transmissions, as further described below. That is, SSC beacons may be based on integrated circuits using solid state transistors rather than being based on vacuum tube transistors, particularly for components such as amplifiers, such as driver amplifiers and power amplifiers (including intermediate power amplifiers (IPAs) and/or high power amplifiers (HPAs)) for radar transmission subsystems, and low noise amplifiers (LNAs) for radar reception subsystems. For example, SSC X band beacons may incorporate solid state power transistors and/or microwave integrated circuits (MICs) as parts of solid state power amplifiers.

Traditional aircraft X band radar systems and X band beacons are based on vacuum tube technology. A traditional vacuum tube based aircraft X band radar system may operate at a power of 1,000 watts (W) or higher, while a traditional X band beacon may operate at a power of 500 watts, in some typical examples. In contrast, a modern solid state aircraft X band weather radar system may typically operate at a low power of around 20 to 40 watts in some examples, rather than 1,000 or more watts as in the traditional vacuum tube based aircraft X band radar systems. The low power of modern solid state aircraft X band weather radar systems, of around 20 to 40 watts in various examples, is insufficient power to interoperate with a traditional X band beacon. Thus, the description above of "low power" aircraft X band radar systems may in typical examples refer to aircraft X band radar systems (e.g., solid state based aircraft X band weather radar systems) that operate at on the order of around 20 to 40 watts, or otherwise substantially less than 1,000 watts, rather than 1,000 or more watts. In an illustrative example, an SSC X band beacon in accordance with this disclosure may incorporate solid state power amplifiers designed to operate at an average power of around 1 watt or less.

Modern, low power, solid state aircraft X band weather radar systems offer many advantages over traditional, vacuum tube based, high power X band aircraft weather radar systems. Besides the inherent advantage of operating at much lower power, thereby imposing lower power requirements, various implementations of solid state radar systems may also enable additional advantages such as phase coherence, higher sensitivity, predictive windshear detection, three-dimensional volumetric radar image buffering, Doppler processing, digital adaptive phased array (DAPA) radar, reduction or elimination of gimbals or other moving parts, reduction in maintenance requirements, and faster scanning of a volume of airspace. However, solid state airborne radar power levels do not feasibly enable interrogation of traditional X band beacons, which are typically only sensitive to high power levels typical of vacuum tube or magnetron based radar systems, especially at long ranges. It is also not feasible to design a solid state radar system to operate at high enough power levels to meet the sensitivity threshold of traditional X band beacons, especially at long ranges. Traditional X band beacons also tend to be large and heavy to accommodate their high power requirements, and tend to require large, expensive batteries for portability. X band beacons may be configured to operate at high power for long-range omnidirectional service, and may typically operate in a frequency band of around 9.3 to 9.5 GHz.

An SSC X band beacon of this disclosure may resolve the challenges noted above and include a X band receiver sensitive enough to detect and respond to X band radar transmissions of low power typical of solid state aircraft X band radar systems. In various examples, an SSC X band beacon of this disclosure may include a solid state based X band receiver and a solid state based X band receiver. An X band receiver of an SSC X band beacon of this disclosure may further include a direct radio frequency (RF) amplifier. An SSC X band beacon of this disclosure may, in response to receiving an incoming X band transmission at a first X band frequency, transmit an outgoing X band transmission at a second X band frequency different from the first X band frequency, which may clearly differentiate the X band beacon transmission from reflections of the aircraft weather radar transmissions in the aircraft weather radar output. Features such as these may enable advantageous features over traditional X band beacons such as high frequency stability, narrow receiver bandwidth, reduced noise, and greater receiver sensitivity, which may be expressed in terms of substantially low minimum discernible signal (MDS). For example, an X band receiver of an SSC X band beacon of this disclosure may be configured to receive low-bandwidth interrogation signals typical of a solid state based aircraft radar. An X band receiver of an SSC X band beacon of this disclosure may be enabled to receive transmissions from an airborne radar transmitter operating with a transmission power of less than or equal to 40 watts, from within a range of greater than 25 nautical miles (nm). In various examples, an SSC X band beacon of this disclosure with a solid state based X band receiver may also be made smaller and lighter and with substantially lower power requirement than a traditional X band beacon.

FIG. 1 depicts an example SSC X band beacon 10 of this disclosure, detecting an X band transmission from and transmitting a response transmission to an interrogating solid state X band radar system 12 onboard an aircraft 20. Aircraft 20 is shown as a helicopter in this example, but the techniques, systems, devices, and methods of this disclosure are generally compatible with any type of aircraft, marine vessel, ground vehicle, or any other type of vehicle or mobile unit. SSC X band beacon 10 is positioned on an oil rig 2 in the ocean in this example. SSC X band beacons in accordance with this disclosure may also be deployed or used on docks, harbors, lighthouses, buoys, bridges, land stations, or any of a wide variety of other contexts.

In an illustrative example, an SSC X band beacon of this disclosure may have receiver bandwidth of one megahertz (MHz) to receive 1 microsecond (μsec) length pulses, and an X band receiver sensitivity of −122 decibel-milliwatts (dBm), which may enable a very low value of minimum discernible signal (MDS), and which is substantially lower than in traditional X band beacons. An SSC X band beacon of this disclosure may therefore be sensitive to an aircraft X band radar transmitter operating at a transmission power at around 20 to 40 watts or lower, from within a range of substantially greater than 25 nautical miles (nm), or otherwise at a range in excess of the reception range requirements specified under at least one of the Document 172 (DO-172) range requirement standard as specified by RTCA, Inc., and the Technical Standard Order (TSO) C102 range requirement standard as specified by the U.S. Federal Aviation Administration (FAA). An SSC X band beacon of this disclosure may use direct radio frequency (RF) amplification and/or low-bandwidth interrogation signal sensitivity to help achieve trigger sensitivity ranges well in excess of 25 nm with 40 W airborne radars.

An SSC X band beacon of this disclosure may also have a substantially lower (e.g., two to four orders of magnitude lower) transmitter power requirement relative to traditional vacuum tube based X band beacons, while enabling its transmissions to be detected by a solid state based aircraft X band radar system. An SSC X band beacon of this disclosure may benefit from advantages enabled by solid state technology as opposed to vacuum tube technology to enable precise frequency detection and signaling, such as high-fidelity amplifiers and high-precision frequency tolerances. With both receiver and transmitter power of an SSC X band beacon of this disclosure being substantially low, an SSC X band beacon may be substantially smaller and more light-weight and support substantially longer battery life and/or smaller batteries for easier portability, and more flexible volume and structural support requirements, relative to traditional vacuum tube based X band beacons.

Various modern aircraft solid state radar systems may be made compatible with an SSC X band beacon of this disclosure simply by loading new software for SSC X band beacon compatibility to the aircraft solid state radar system. A solid state aircraft X band weather radar may thus use an SSC X band beacon of this disclosure as a navigation aid for the aircraft to navigate to the position of the X band beacon, for example. The X band reply generated by an SSC X band beacon may be at a frequency different from the airborne radar transmission to allow differentiation between SSC X band beacon reply transmissions and natural echo returns of the outgoing aircraft radar transmissions. A software unit or upgrade to an aircraft weather radar system for compatibility with an SSC X band beacon of this disclosure may include software for recognizing and identifying one or more return frequencies transmitted by one or more SSC X band beacons of this disclosure, and/or code for decoding information that an SSC X band beacon may encode into its transmission, as further discussed below, for example. The software unit or upgrade to an aircraft weather radar system for compatibility with an SSC X band beacon of this disclosure may further include software defining an interoperability specification of the aircraft weather radar system configuring the aircraft weather radar system to send one or more pulses longer than normal for weather radar scans, which may promote higher sensitivity for the SSC X band beacon to be able to detect and respond to the transmissions emitted by the aircraft weather radar system.

In one example use case, SSC X band beacons may be deployed on mobile assets such as oil rigs or marine vessels to assist in aircraft navigation to the mobile assets. This may be particularly useful for navigation in low-visibility weather conditions, and for navigating to oil rigs or other assets that are typically moved around, and do not remain at a single GPS coordinate location. Some helicopters in particular may typically be small and may not have enough space to be outfitted with both a solid state X band radar system to use for weather radar purposes and a separate vacuum tube based X band radar system dedicated for interrogating and navigating by traditional, low-sensitivity X band beacons. Outfitting a single helicopter or other aircraft with both a solid state X band radar system and a vacuum tube based X band radar system, or a single radar system that includes both solid state and vacuum tube based transmitters, would also pose substantial economic and weight penalties. An SSC X band beacon of this disclosure may enable aircraft to gain the benefit of X band beacon interoperability with a solid state X band aircraft radar system, thus eliminating the rationale for outfitting an aircraft with both types of X band radar.

In various examples, an SSC X band beacon of this disclosure may also enable coded transmissions in response to detecting incoming X band radar transmissions from an aircraft radar system. An SSC X band beacon of this disclosure may encode information in its response transmissions, such as identification, location, and bearing data. The aircraft radar system may be configured to decode the response transmission from an SSC X band beacon of this disclosure. An SSC X band beacon of this disclosure may also enable a search and rescue transponder (SART) sweep frequency capability, e.g., 0.4 and 7.5 microsecond sweep cycles through the X band in response to an X band interrogation.

Figure 2:
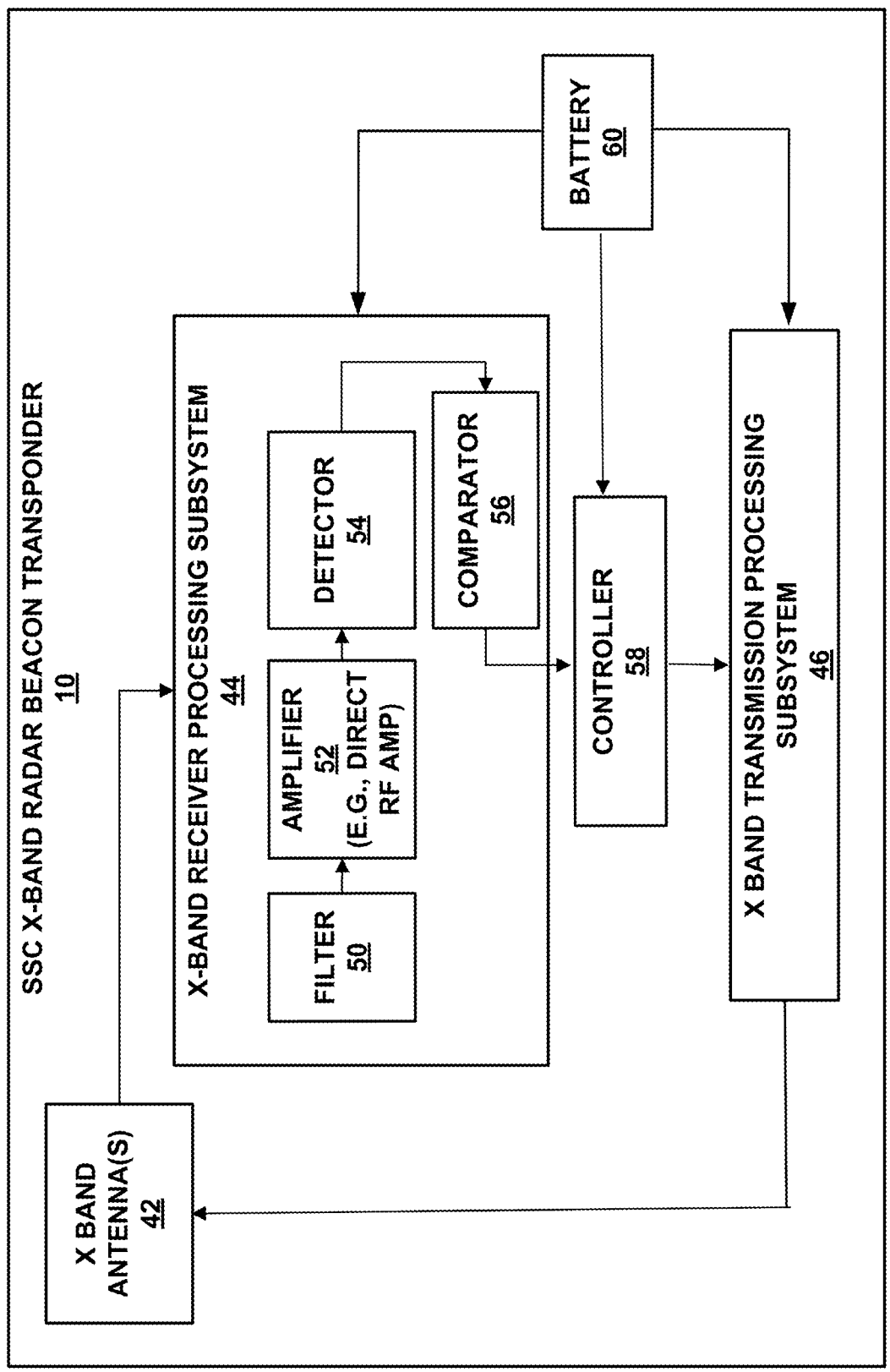
FIG. 2 depicts a conceptual block diagram of an example SSC X band beacon of this disclosure, implemented as a solid state X band beacon in this example.

FIG. 2 depicts a conceptual block diagram of an example SSC X band beacon 10 of this disclosure, implemented as a solid state X band beacon in this example. SSC X band beacon 10 includes one or more radar antennas 42, a receiver processing subsystem 44, a controller 58, and a radar transmission processing subsystem 46, powered by one or more batteries 60. Receiver processing subsystem 44 may be electrically coupled to the one or more radar antennas 42 and may receive an electrical signal (e.g., AC voltage or current) from one or more radar antennas 42 in response to an X band transmission signal from an aircraft intercepting radar antennas 42. As is clear from the description, the various components of SSC X band beacon 10 are based on solid state technology, and enable detection of low-power incoming transmission signals and generating low-power response transmission signals, such as with transmission power on the order of around 20 to 40 watts from within a range of greater than 25 nautical miles.

Receiver processing subsystem 44 may include filter 50, amplifier 52, detector 54, and comparator 56. Receiver processing subsystem 44 is an example of a receiver. Radar receiver processing subsystem 44 may also generally be considered and referred to as a radio receiver, a microwave receiver, or an X band receiver. In other examples, receiver processing subsystem 44 may be implemented to receive transmissions in other radio or microwave bands, or other frequency bands, as well as or instead of X band transmissions.

Filter 50 may include a microstrip filter (e.g., a filter etched onto a printed circuit board (PCB) or onto a flexible substrate such as a dielectric substrate), such as a high-pass filter, low-pass filter, or bandpass filter. Filter 50 may attenuate electrical signals with a frequency that does not fall within a predetermined threshold frequency (e.g., is less than a threshold frequency, greater than a threshold frequency, or does not fall within a range determined by a first threshold frequency and a second threshold frequency).

Amplifier 52 may include one or more transistor-based amplifiers, operational amplifiers, or any other type of amplification circuitry. Amplifier 52 may comprise a direct radio frequency (RF) amplifier, which may enable substantially enhanced sensitivity to low power incoming X band transmissions, relative to traditional receiver amplifiers and accompanying components. In some examples, amplifier 52 includes one or more solid state low noise amplifiers (LNAs), which may be situated between X band antenna 42 and a direct RF amplifier. Amplifier 52 may include a filter (e.g., a bandpass filter) situated between an LNA and a direct RF amplifier. Amplifier 52 may receive an AC electrical signal from one or more radar antennas 42 (via filter 50), amplify the AC electrical signal, and output the amplified AC electrical signal.

Detector 54 may receive the amplified AC electrical signal from amplifier 52, convert the AC electrical signal to a DC electrical signal, and output the amplified DC electrical signal. Detector 54 may be a root-mean-squared (RMS) power detector, in some examples. Comparator 56 may receive the DC electrical signal from detector 54, convert the DC electrical signal to a digital value, and output the digital value to controller 58. Comparator 56 may be comprised in or replaced by an analog-to-digital converter (ADC) in various examples.

Controller 58 may include at least one processor and at least one memory device. The processor, as well as other processors described in this disclosure, may include one or more digital signal processors (DSPs), general purpose microprocessors, application specific integrated circuits (ASICs), field programmable logic arrays (FPGAs), or other equivalent integrated or discrete logic circuitry, or combinations thereof. The functions attributed to the controllers and processors described herein may be provided by a hardware device and embodied as software, firmware, hardware, or any combination thereof.

The one or more memory devices described herein may include any one or more volatile or non-volatile media, such as a random access memory (RAM), read only memory (ROM), non-volatile RAM (NVRAM), electrically erasable programmable ROM (EEPROM), flash memory, and the like. The one or more memory devices may store computer-readable instructions that, when executed by the one or more processors cause controller 58 to perform various functions described herein.

Controller 58 may include a microcontroller electrically coupled to comparator 56. In some examples, controller 58 may receive the digital value from comparator 56 and determine whether to output a transmission signal in response to an incoming transmission signal potentially represented by the digital value from comparator 56. Controller 58 may implement processing of the incoming signal in electronic hardware components, with software-defined processing in a central processing unit (CPU) or a graphical processing unit (GPU), or in any combination of hardware and software. In some examples, controller 58 may include a signal processing computer that performs initial processing of the received signals, and a general purpose computer that receives outputs from the signal processing computer and performs additional signal detection and analysis.

If comparator 58 determines that the digital value from comparator 56 represents an incoming X band transmission signal that merits a response, controller 58 may generate an output to radar transmission processing subsystem 46 to generate a response transmission. Radar transmission processing subsystem 46 may then generate a response transmission to transmit, and communicate the response transmission to antennas 42 for transmission. Controller 58 and/or radar transmission processing subsystem 46 may also encode information in the response transmission, such as identification, location, and bearing information. Radar transmission processing subsystem 46 may incorporate solid state components such as driver amplifiers and solid state power amplifiers (potentially including one or more IPAs and/or one or more HPAs), and microwave integrated circuits (MICs), as described above.

Figure 3:
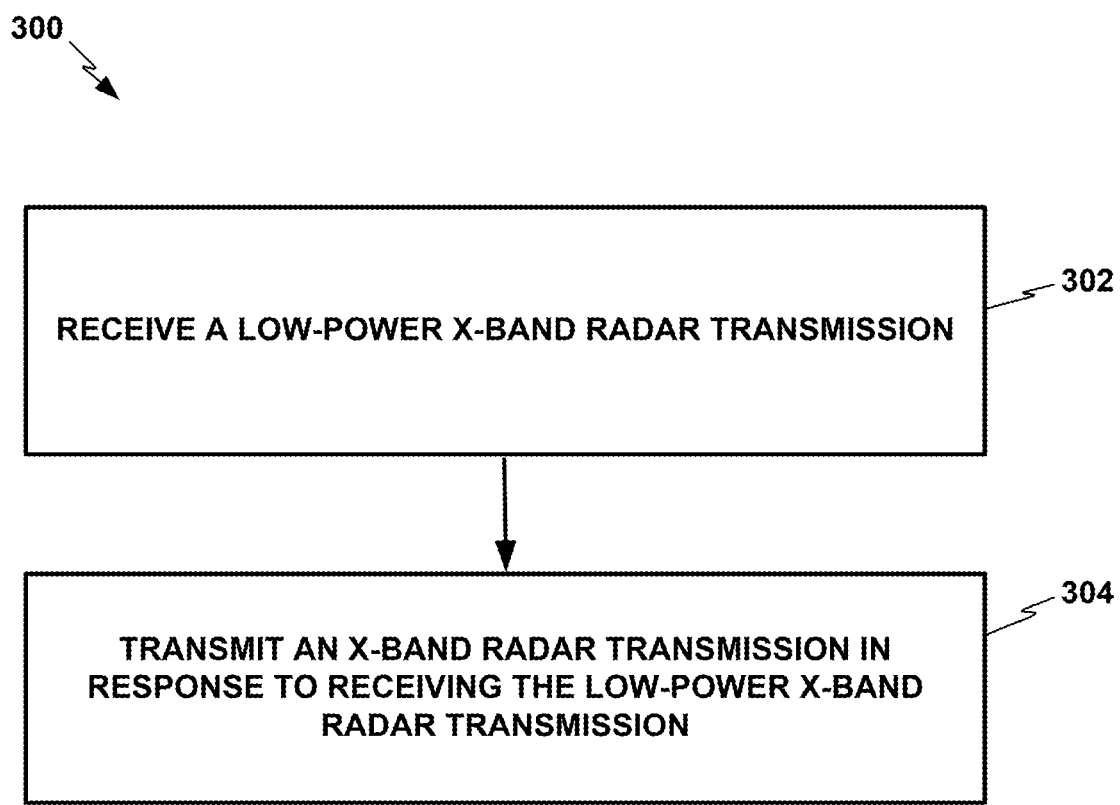
FIG. 3 depicts a flowchart for an example method that may be implemented by an SSC X band beacon of this disclosure.

FIG. 3 depicts a flowchart for an example method 300 that may be implemented by an SSC X band beacon of this disclosure. Method 300 includes receiving a low-power X band radar transmission (302), e.g., by a solid state compatible receiver, such as a receiver comprising a direct RF amplifier. Method 300 further includes transmitting an X band transmission in response to receiving the low-power X band radar transmission (304), e.g., by a solid state transmitter such as described above. Various examples of method 300 may include any of the processes or functions described and depicted herein.

A solid state radar as disclosed herein may be implemented with any of a variety of types of circuit elements, such as nonvolatile random-access memory (RAM) or other types of memory, mixed-signal integrated circuits, central processing units (CPUs), application-specific integrated circuits (ASICs), field programmable gate arrays (FPGAs), microcontrollers, programmable logic controllers (PLCs), systems on a chip (SoCs), a subsection of any of the above, an interconnected or distributed combination of any of the above, or any other type of component or one or more components capable of being configured to implement a solid state X band beacon system in accordance with any of the examples disclosed herein.

A "vehicle" as described herein may include any type of aircraft, marine vessel, ground vehicle, launch vehicle, suborbital vehicle, orbital satellite, spacecraft, or any other type of vehicle. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery drone or other craft).

While various examples have been discussed in terms of the X band frequency range, and transponder devices configured to receive X band signals and to transmit X band transmissions in response to receiving X band signals, these are illustrative and non-limiting examples of a broader array of implementations of the concepts of this disclosure. In other example implementations of the concepts of this disclosure, a solid state based transponder device may be configured to operate in any one or more of any of a variety of frequency bands that may also be compatible with solid state based components. While some examples are described in terms of a transponder device configured to detect and respond to signals from an X band aircraft weather radar system, this is an illustrative and non-limiting example. In various example implementations of the concepts of this disclosure, a solid state based transponder device may be configured to detect and respond to signals from any of a wide range of types of signal transmitters. In some examples, a transponder device in accordance with this disclosure may receive and/or send signals or transmissions in a plurality of electromagnetic frequency bands, which may include X band in some examples.

In some examples, a transponder device in accordance with this disclosure may, in response to detecting or receiving an X band transmission or other type of signal, transmit signals or transmissions in a plurality of frequency bands, or otherwise perform a plurality of actions in response to the detecting or receiving of an incoming transmission. For example, a transponder device in accordance with this disclosure may, in response to detecting an incoming X band transmission, send out both an X band transmission and a visible frequency signal, e.g., one or more beams or flashes of visible light, which may also aid navigation. In some examples, a transponder beacon device of this disclosure may also, in response to receiving an incoming signal, perform additional actions, such as emit a sound, or send navigational or logging data over a datalink, WiFi, networking, or other communication channel, configured to be capable of reception by an aircraft transmitting the incoming signal and/or by other parties, such as navigation service providers or transportation authorities.

While some examples are discussed in terms of a transponder beacon device responding to an incoming signal generated by a solid state X band aircraft radar disposed on an aircraft, this is an illustrative and non-limiting example. A solid state compatible transponder beacon device of this disclosure may be capable of responding to signals generated by a vacuum tube based transmitter, such as vacuum tube based aircraft X band weather radar systems.

Various aspects of the disclosure have been described. These and other aspects are within the scope of the following claims.

The invention claimed is:

1. A device comprising:
    a receiver configured to receive X band radar transmissions from an airborne radar transmitter operating with a transmission power of less than or equal to 40 watts, wherein the receiver comprises one or more filters, one or more solid state amplifiers, a detector, and a comparator;
    a controller implemented in circuitry, wherein the controller is communicatively coupled to the comparator;
    a transmitter operably coupled to the receiver and configured to transmit an X band transmission in response to receiving the X band radar transmissions, wherein the transmitter is communicatively coupled to the controller; and
    one or more antennas communicatively coupled to the receiver and to the transmitter.

2. The device of claim 1, wherein the receiver comprises a direct radio frequency (RF) amplifier.

3. The device of claim 1, wherein the receiver comprises one or more solid state receiver components configured to receive X band interrogation signals, wherein a bandwidth of the X band interrogation signals is less than or equal to one megahertz.

4. The device of claim 1, wherein the receiver is configured to receive the transmissions from a range of greater than 25 nautical miles (nm).

5. The device of claim 4,
wherein the airborne radar transmitter is a proximate airborne radar transmitter, and
wherein the receiver is configured to receive the transmissions from the proximate airborne radar transmitter operating at less than or equal to 40 watts within a range as specified under at least one of the DO-172 range requirement standard and the TSO C102 range requirement standard.

6. The device of claim 1, wherein the transmitter is further configured to transmit the X band transmissions at a different frequency than a frequency of the received X band radar transmissions.

7. The device of claim 1, wherein the device is further configured to encode information in the X band transmissions sent via the transmitter.

8. The device of claim 1, wherein the receiver comprises one or more solid state low noise amplifiers (LNAs).

9. The device of claim 1, wherein the transmitter comprises one or more solid state power amplifiers.

10. The device of claim 9, wherein the one or more solid state power amplifiers comprise one or more solid state power transistors.

11. The device of claim 9, wherein the one or more solid state power amplifiers comprise one or more microwave integrated circuits (MICs).

12. The device of claim 1, wherein the transmitter comprises one or more solid state driver amplifiers.

13. The device of claim 1, wherein the one or more solid state amplifiers comprise a filter configured to attenuate electrical signals not within a predetermined threshold frequency.

14. The device of claim 1, wherein the detector is configured to convert an alternating current electrical signal to a direct current electrical signal.

15. The device of claim 1, wherein the comparator comprises an analog-to-digital converter configured to receive a direct-current electrical signal from the detector.

16. A system comprising:
a solid state receiver configured to receive X band radar transmissions from an airborne radar transmitter operating with a transmission power of less than or equal to 40 watts, wherein the solid state receiver comprises one or more filters, one or more solid state low noise amplifiers, one or more solid state direct radio frequency amplifiers, a detector, and a comparator;
a controller implemented in circuitry, wherein the controller is communicatively coupled to the comparator;
a solid state transmitter operably coupled to the receiver and configured to transmit an X band transmission in response to receiving the X band radar transmissions, wherein the solid state transmitter is communicatively coupled to the controller; and
one or more antennas communicatively coupled to the solid state receiver and to the solid state transmitter.

17. The system of claim 16, wherein the solid state transmitter comprises one or more solid state transmission components, and the solid state receiver comprises one or more solid state reception components.

18. The system of claim 16,
wherein the airborne radar transmitter is a proximate airborne radar transmitter,
wherein the receiver is configured to receive the transmissions from the proximate airborne radar transmitter from a range of greater than 25 nautical miles.

19. A method comprising:
receiving, via a receiver comprising one or more filters, one or more solid state amplifiers, a detector, and a comparator, X band radar transmissions from an airborne radar transmitter operating with a transmission power of less than or equal to 40 watts; and
transmitting, via a transmitter operably coupled to the receiver, in response to receiving the X band radar transmissions, an X band transmission,
wherein one or more antennas are communicatively coupled to the receiver and to the transmitter, and
wherein a controller implemented in circuitry is communicatively coupled to the comparator and to the transmitter.

20. The method of claim 19, wherein the airborne radar transmitter is a proximate airborne radar transmitter, further comprising receiving the transmissions from the proximate airborne radar transmitter operating with a power of less than or equal to 40 watts within a range as specified under at least one of the DO-172 range requirement standard and the TSO C102 range requirement standard.

* * * * *